United States Patent [19]
Smith

[11] Patent Number: 5,725,343
[45] Date of Patent: Mar. 10, 1998

[54] SEALING FASTENER

[75] Inventor: Edward John Smith, Bonita Springs, Fla.

[73] Assignee: Eustathios Vassiliou, Newark, Del.

[21] Appl. No.: 741,337

[22] Filed: Oct. 29, 1996

[51] Int. Cl.⁶ .................. F16B 13/06; F16B 43/02
[52] U.S. Cl. .................. 411/55; 411/61; 411/542; 411/182
[58] Field of Search ................ 411/55, 60, 61, 411/182, 258, 542, 544, 915

[56] References Cited

U.S. PATENT DOCUMENTS

| | | | |
|---|---|---|---|
| 4,245,652 | 1/1981 | Kelly et al. | 411/542 X |
| 4,500,238 | 2/1985 | Vassiliou | 411/30 |
| 4,792,475 | 12/1988 | Bien | 411/258 X |
| 4,874,277 | 10/1989 | Nowak et al. | 411/61 |
| 5,100,273 | 3/1992 | Vassiliou | 411/30 X |
| 5,314,280 | 5/1994 | Gagliardi et al. | 411/182 |

OTHER PUBLICATIONS

Sketch of fastener being sold presently in the marketplace.

*Primary Examiner*—Neill R. Wilson
*Attorney, Agent, or Firm*—E. Vassiliou

[57] ABSTRACT

A sealing fastener, which expands by the insertion of preferably a screw. The fastener comprises a substantially flat and two expandable legs. The head has an upper side and a lower side, preferably separated by a gap. The fastener has further an elastic body molded at least on the lower surface of the head. A large unexpected improvement is achieved by having the elastic body also molded in the gap between the upper surface and the lower surface.

43 Claims, 3 Drawing Sheets

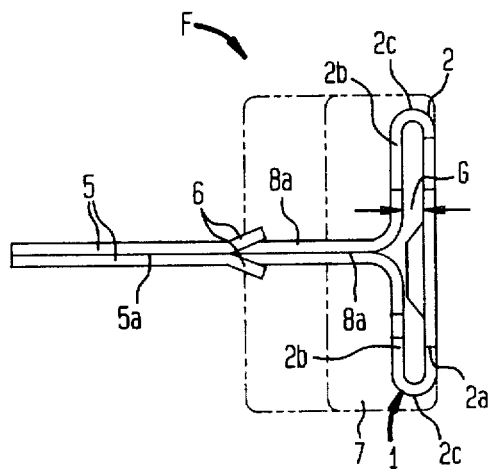
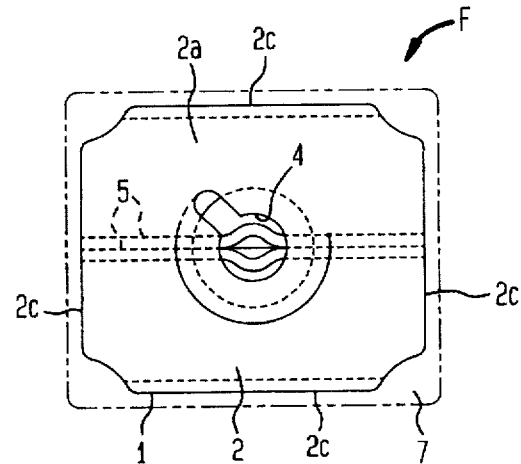
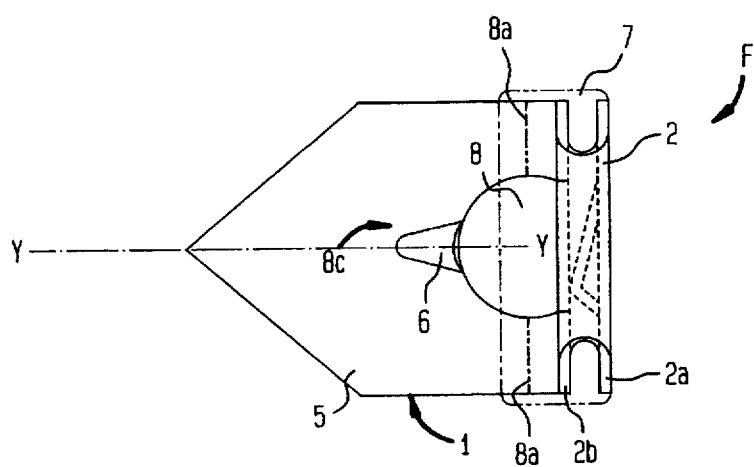
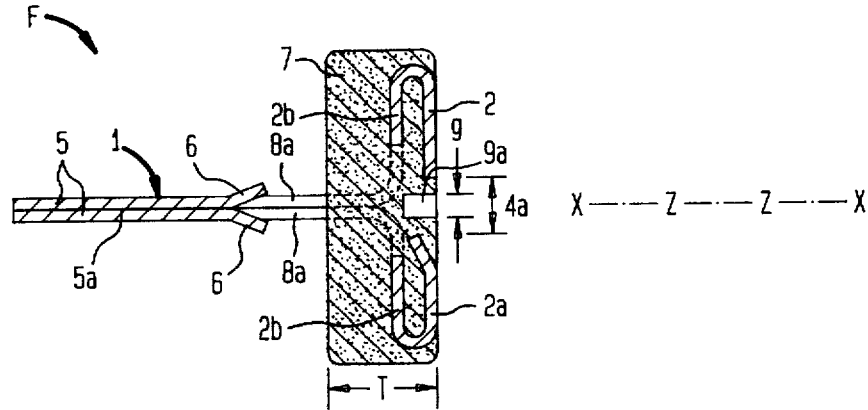

SEALING FASTENER

FIELD OF THE INVENTION

This invention pertains to fasteners, and more particularly fasteners which attach one object to another in a water-resistant and vibration resistant manner.

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult if not impossible for all practical purposes. In addition, such connections are not water-resistant and water may be easily penetrate the connection point and be transferred from one side of one or both objects to the other side. Further, vibration during the operation of a device, such as an automobile or appliance for example, containing the two objects very often results in loosening of the bolt and in either full disassembling of the objects from each other, or in a vibration noise which is most annoying and often of unacceptable levels.

Recently, fasteners of the type described in U.S. Pat. No. 4,500,238 (Vassiliou) have been utilized to reduce considerably the potential of bolt or screw loosening and vibration. They have also eliminated the problem of having to place one member of the fastener at the back portion of the hollow object. These fasteners are placed through a slot from the front part of the hollow object. The second part of the fastener, being usually a bolt or a screw, supports the second object by forcing the legs of the fastener (as described for example in U.S. Pat. No. 4,500,238) to open or expand, thereby securing the two objects together.

Nevertheless, due to the rather open configuration of such systems, water may pass through the slots described above on the two objects. Further, although vibration noises due to loosening of the screw or bolt have been reduced greatly by the use of these fasteners (since the potential for screw or bolt loosening has been reduced greatly), vibration noises may still exist due to vibrations transferred from one solid to the other through the rigid connection of the two objects.

Single fasteners, having an elastic waterproofing element, but which lack an expanding member, such as a screw or a bolt for example, exist in the market, but they are by nature considerably less sturdy and do not confront the severe difficulty for water resistance, which difficulty is introduced by the presence of the expanding member and by the overwhelming expansion of the legs of the fastener of the instant invention.

There is, therefore, a need for a fastener which presents good and versatile attachment characteristics for securing two objects to each other by means of an expanding member such as a screw or a bolt for example, and which fastener is vibration resistant, and it also presents waterproofing characteristics.

SUMMARY OF THE INVENTION

As aforementioned, this invention pertains fasteners which attach one object to another in a waterproof or watertight manner. More particularly, it pertains a fastener comprising:

(a) a substantially flat head portion having a perimeter, an upper side, and a lower side, the upper side having a hole, the hole having a first diameter and a first axis, the first axis being substantially perpendicular to the substantially flat head portion;

(b) a neck having an opening and two substantially flat neck portions, the neck extending from the lower side of the substantially flat head portion at a substantially right angle with respect to the substantially flat head portion;

(c) two substantially flat legs extending from the neck, each leg having an inner surface, the two surfaces of the two legs being at an initial substantial contact with each other, the legs being adapted to expand in opposite direction upon insertion through the hole of an expanding member;

(d) a funnel configuration at a leg region where the legs start extending from the neck, the funnel having a second axis substantially coinciding with the first axis; and (e) an elastic body integrally molded at least at the lower side of the substantially flat head portion.

The instant invention also pertains an assembly of two objects connected substantially in a water-tight mode with a fastener, the fastener comprising:

(a) a substantially flat head portion having a perimeter, an upper side, and a lower side, the upper side having a hole, the hole having a first diameter and a first axis, the first axis being substantially perpendicular to the substantially flat head portion;

(b) a neck having an opening and two substantially flat neck portions, the neck extending from the lower side of the substantially flat head portion at a substantially right angle with respect to the substantially flat head portion;

(c) two substantially flat legs extending from the neck, each leg having an inner surface, the two surfaces of the two legs being at an initial substantial contact with each other, the legs being adapted to expand in opposite direction upon insertion through the hole of an expanding member;

(d) a funnel configuration at a leg region where the legs start extending from the neck, the funnel having a second axis substantially coinciding with the first axis; and (e) an elastic body integrally molded at least at the lower side of the substantially flat head portion.

The fastener of the instant invention is particularly suitable in the case that the assembly of the two objects is a part of an automobile.

It is very important that the upper side and the lower side of the substantially flat portion are separated by a gap which is large enough to allow the elastic body to fill said gap during the molding operation of said elastic body. The gap is preferably larger than 0.1 mm, more preferably between 0.2 and 5 mm, and even more preferably in the range of 0.5 and 2 mm. If the gap is smaller than 0.1 mm, the elastic body finds difficulty in passing through said small gap and fill it, and in addition the waterproofing is inferior. If it is larger than 5 mm the fastener increases dimensions without considerable benefit, and it becomes cumbersome if the gap exceeds 5 mm considerably.

Preferably, the elastic body is further molded at the perimeter of the substantially flat head portion. Even more preferably, the elastic body is further molded on the upper side of the substantially flat head portion. Also preferably, at least part of each of the two neck portions is uninterruptedly surrounded by part of the elastic body.

The expanding member may be a screw having threads and a root, the root having a second diameter.

Preferably, the elastic body further comprises a depression having a third axis substantially coinciding with the first and the second axis; and a third diameter smaller than the second diameter.

The elastic body may preferably be foamed and/or be selected from a group comprising plastisol, polyurethane, and a mixture thereof.

The hole is preferably adapted to engage threads of a screw, and the funnel to lead said screw in a direction substantially coinciding with the first axis and expand the two legs.

BRIEF DESCRIPTION OF THE DRAWING

The reader's understanding of this invention will be enhanced by reference to the following detailed description taken in combination with the drawing figures, wherein:

FIG. 1A illustrates schematically a side view of a fastener according to a preferred embodiment of the instant invention with an elastic body extending either about halfway down the neck portion or down to the funnel region.

FIG. 1B illustrates schematically the top view of the fastener according to the preferred embodiment of the instant invention illustrated in FIG. 1A with an elastic body extending about halfway down the neck portion.

FIG. 1C illustrates schematically the front view of the fastener according to the preferred embodiment of the instant invention illustrated in FIG. 1A with an elastic body extending about halfway down the neck portion.

FIG. 1D illustrates schematically a cross section of the side view of the fastener according to the preferred embodiment of the instant invention illustrated in FIG. 1A with an elastic body extending about halfway down the neck portion.

DETAILED DESCRIPTION OF THE INVENTION

Figure 2A:
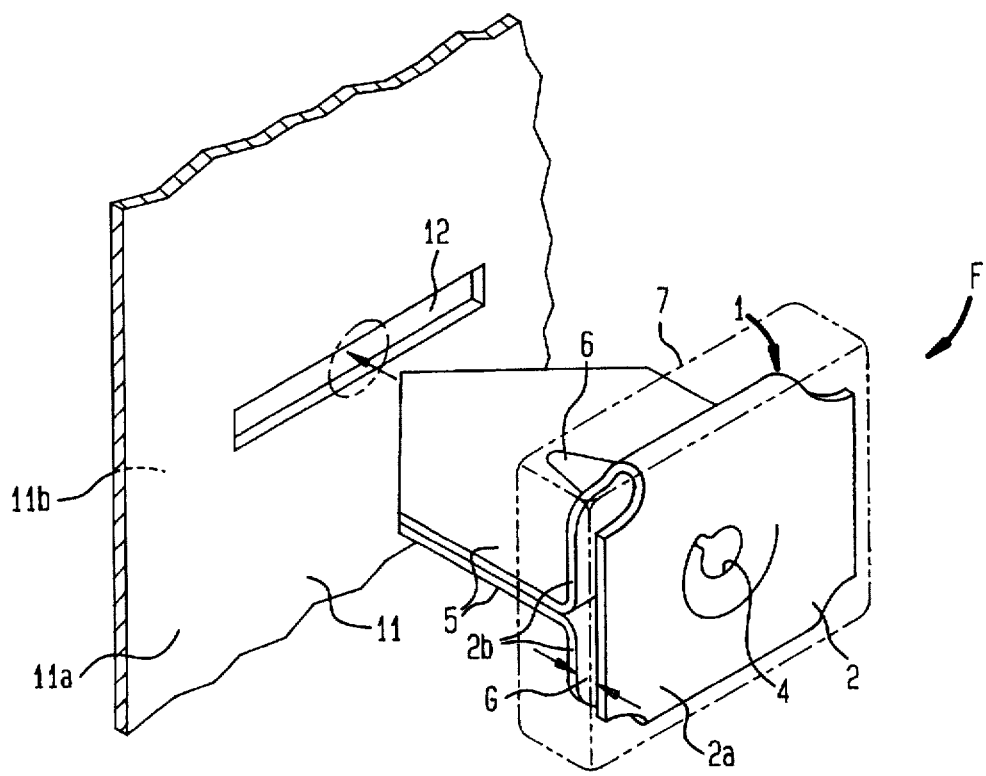
FIG. 2A illustrates a perspective view of the fastener of the of FIG. 1, and an object having a slot commensurate to the dimensions of the legs of the fastener.

As aforementioned, this invention pertains to expanding fasteners which can secure two or more objects in a substantially water-tight mode.

Referring now to FIGS. 1A to 1D, there is depicted a sealing fastener F, which comprises a fastener 1, similar to the fasteners described in U.S. Pat. No. 4,500,238, having a substantially flat head portion 2. The substantially flat head portion 2 has an upper side 2a, a lower side 2b, and a perimeter 2c. The upper side 2a has a hole, which hole has a first diameter 4a (FIG. 1D) and a first axis X—X. The first axis X—X is substantially perpendicular to the substantially flat head portion 2.

The upper side 2a and the lower side 2b are separated by a gap G as better shown in FIG. 1A.

The fastener 1 further comprises a neck 8c having a cutting or opening 8 and two flat neck portions 8a. The neck 8c extends from the lower side 2b of the substantially flat head portion 2 at a substantially right angle with respect to the substantially flat head portion 2 of the fastener 1. The cutting or opening 8 may have any appropriate dimensions. For example, it may have a general round shape as shown in FIG. 1C, or it may be elongated, or it may be just a thin slit parallel to the plane of and adjacent to the substantially flat head portion 2. In the case that it is just a thin slit adjacent to the substantially flat head portion 2, the funnel 6 will also be adjacent to the substantially flat head portion 2, and the two flat neck portions 8a will be minuscule in length from the lower side 2b to the beginning of the legs in the vicinity of the funnel 6.

Two substantially flat legs 5 extend from the neck 8c. Each leg has an inner surface 5a, the two surfaces 5a are at an initial substantial contact with each other. The legs are adapted to expand upon insertion through the hole of an expanding member, such as a screw, bolt, nail and the like for example.

There is also a funnel configuration 6 at the leg region where the legs start extending from the neck at the bottom of the cutting or opening 8. The funnel has a second axis Y—Y, substantially coinciding with the first axis X—X.

An elastic body 7 is integrally molded at least at the lower side 2b of the substantially flat head portion 2 of the fastener 1. If the elastic body is molded only at the lower side 2b, a certain amount of waterproofing is achieved. However, when the elastic body is also molded within the gap G, an unexpectedly high improvement in waterproofing occurs as compared to the degree of waterproofing obtained by molding the elastic body only at the lower side 2b.

Figure 2B:
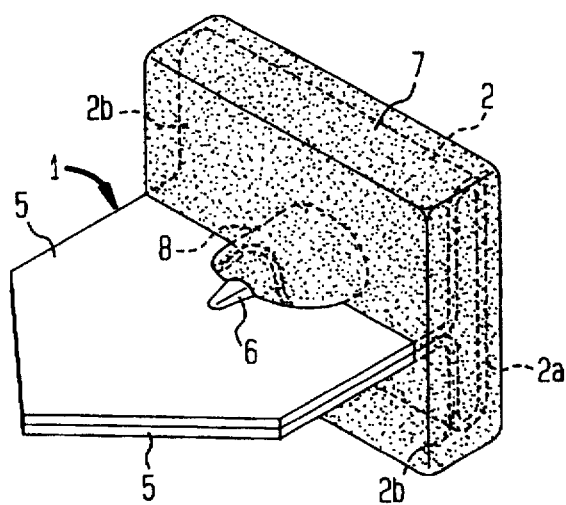
FIG. 2B illustrates a perspective view of the fastener of FIG. 1, with the elastic body extending about halfway down the neck portion and covering the opening of the neck.

Measurable improvements also occur when the elastic body is molded around the perimeter 2c and over the upper side 2a, as well as when it covers the opening 8 and extends at least partially over the funnel 6, as better illustrated in FIG. 2B.

As discussed earlier, the gap is preferably larger than 0.1 mm, more preferably between 0.2 and 5 mm, and even more preferably in the range of 0.5 and 2 mm. If the gap is smaller than 0.1 mm, the elastic body finds difficulty in passing through said small gap and fill it during the molding operation. In addition, the waterproofing is inferior. If it is larger than 5 mm the fastener has increased dimensions without considerable benefit, and it becomes cumbersome.

Figure 3A:
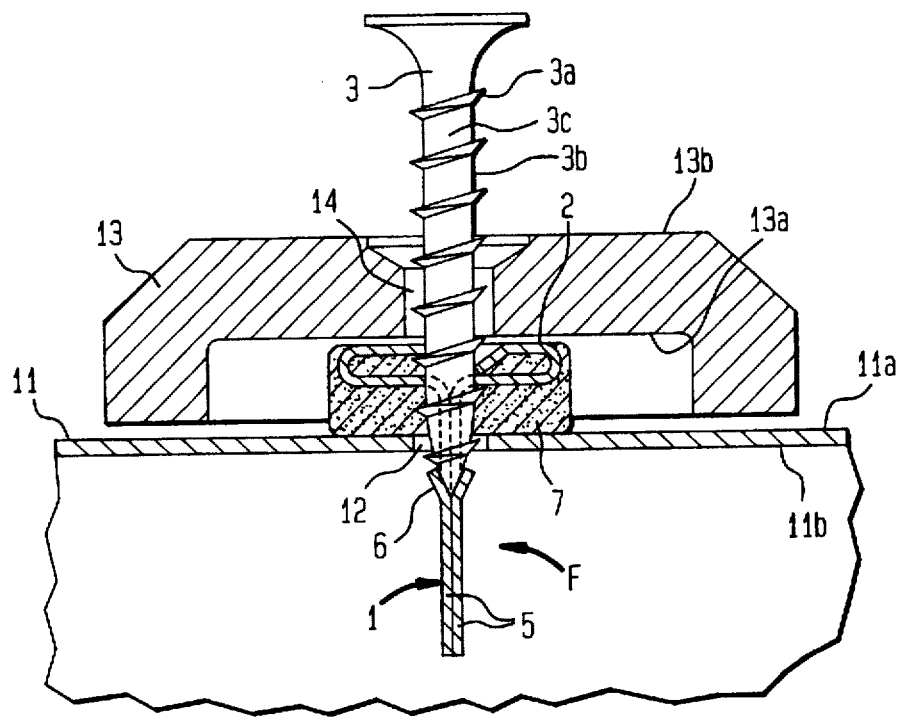
FIG. 3A illustrates schematically an assembly of 2 objects with a fastener of the instant invention and a screw which has been inserted just through the hole.

FIG. 2A is a perspective view of the sealing fastener F before its insertion into a slot 12 of a first object 11, which object 11 has a a front surface 11a and a back surface 11b. FIG. 3A shows a cross section of the first object 11, which may be for example a sheet of metal or plastic, with the fastener 1 inserted into the slot 12, and a second object 13 ready to be attached to the first object 11. The object 13 has two surfaces 13a and 13b. There is also depicted an expanding member, such as screw 3 for example, which has such dimensions as to be adapted to pass through hole 14 of the second object 13. The screw 3 has a thread 3a and a root 3b, which root 3b has a second diameter 3c.

The molding 7 has a thickness T (FIG. 1D), and preferably a depression or guiding hole 9. The depression or guiding hole 9 has a third diameter 9a which is preferably smaller than the second diameter 3c (diameter of the root 3b of screw 3). The depression or guiding hole 9 may extend partially or totally along the thickness T of the elastic body. If the depression 9 has a varying diameter through the thickness T, then the third diameter 9a is the smallest of the varying diameters. The depression 9 has also a third axis Z—Z which substantially coincides with the first axis X—X and the second axis Y—Y.

Figure 3B:
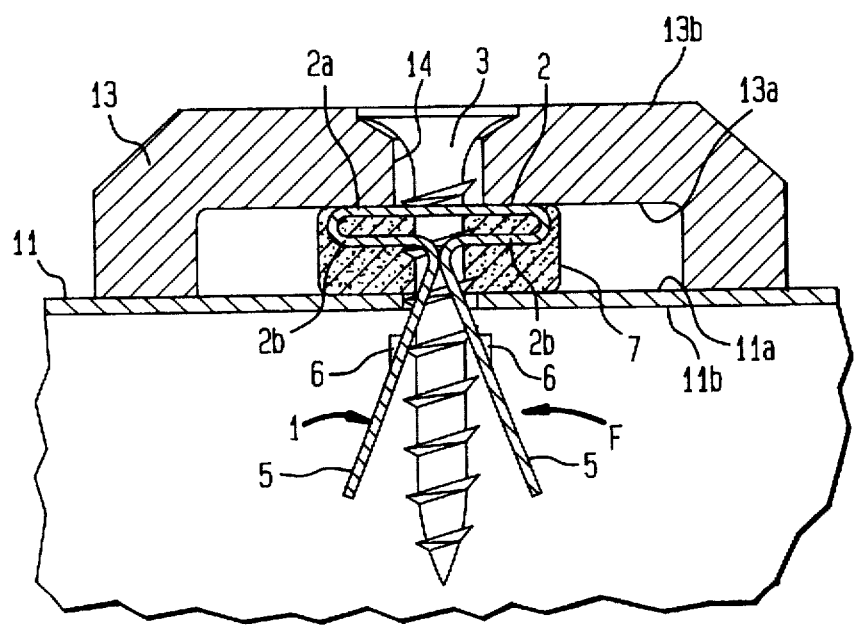
FIG. 3B illustrates schematically an assembly of the two objects of FIG. 1 with the screw having been inserted completely through the fastener in a manner to expand the legs and to connect the two objects in a substantially water tight manner.

FIG. 3B shows the two objects, first object 11 and second object 13, connected together after the screw 3 has been inserted completely into the sealing fastener F and the legs 5 of said fastener have been expanded.

Figure 4:
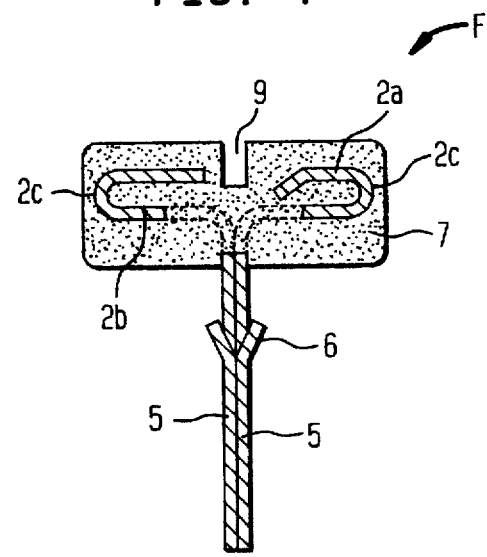
FIG. 4 illustrates schematically the cross section of a fastener according to another preferred embodiment of the instant invention illustrated wherein the elastic body extends from over the upper side of the substantially flat heat portion to about halfway down the neck portion.

FIG. 4 shows a cross section of sealing fastener F according to the instant invention, wherein the elastic body 7 has been molded all the way around and within the substantially flat head portion 2 of fastener 1.

In operation, the fastener F (see FIG. 2A) is inserted into the slot 12 of the first object 11. In sequence, the second object 13 (see FIG. 3A) is positioned on top of the first object 11 in a manner that the hole 14 of the second object 13 is aligned with the hole 4 of fastener 1 and/or the depression or guiding hole 9 of the elastic body 7 of the fastener 1. In turn, the screw 3 is inserted through the hole 14 of the second object 13 and forced to penetrate into the elastic body 7, and engage with the preferably commensurate hole 4 of fastener 1. The screw 3 is then threaded or otherwise forced to fully penetrate (see FIG. 3B) the elastic body 7. During its course of being inserted into the fastener F, it meets the funnel 6, and as it proceeds further, it forces the legs 5 to expand and compress the elastic body 7 onto the front surface 11a, thus hermetically sealing the first object 11 onto the second object 13, in a manner that no water can move through the slot 12 and/or portions of the fastener F from the side of the back surface 11b to the side of the front surface 11a of the first object 11, and vice versa. This type of connection helps also in reducing squeaking noises due to vibrations.

If it is desirable to waterproof the object 13 so that no water may leak through hole 14 from the side of surface 13b to the side of surface 13a or vice versa, the fastener F, better shown in FIG. 4 is more appropriate. At the end of threading the screw 3 on the preferably commensurate hole 4, the surface 13a is forced against the elastic body 7, thereby compressing said elastic body in a waterproof manner.

In both cases, a tight contact between the root and the threads of the screw 3 and the elastic body 7 ensure no leakage through said contact.

As aforementioned, the elastic body may preferably be foamed and/or be selected from a group comprising plastisol, polyurethane, and a mixture thereof.

Examples demonstrating the operation of the instant invention have been given for illustration purposes only, and should not be construed as limiting the scope of this invention in any way. In addition it should be stressed that the preferred embodiments discussed in detail hereinabove, as well as any other embodiments encompassed within the limits of the instant invention, may be practiced individually, or in any combination thereof, according to common sense and/or expert opinion. These combinations also lie within the realm of the present invention. Furthermore, any attempted explanations in the discussion are only speculative and are not intended to narrow the limits of this invention.

What is claimed is:

1. A fastener comprising:
   (a) a substantially flat head portion having a perimeter, an upper side, and a lower side, the upper side having a hole, the hole having a first diameter and a first axis, the first axis being substantially perpendicular to the substantially flat head portion;
   (b) a neck having an opening and two substantially flat neck portions, the neck extending from the lower side of the substantially flat head portion at a substantially right angle with respect to the substantially flat head portion;
   (c) two substantially flat legs extending from the neck, each leg having an inner surface, the two surfaces of the two legs being at an initial substantial contact with each other, the legs being adapted to expand in opposite direction upon insertion through the hole of an expanding member;
   (d) a funnel configuration at a leg region where the legs start extending from the neck, the funnel having a second axis substantially coinciding with the first axis; and
   (e) an elastic body integrally molded at the lower side of the substantially flat head portion wherein the elastic body is selected from a group comprising plastisol, polyurethane, and a mixture thereof.

2. A fastener as defined in claim 1, wherein the elastic body is foamed.

3. A fastener as defined in claim 1, wherein at least part of each of the two neck portions is uninterruptedly surrounded by part of the elastic body.

4. A fastener comprising:
   (a) a substantially flat head portion having a perimeter, an upper side, and a lower side, the upper side having a hole, the hole having a first diameter and a first axis, the first axis being substantially perpendicular to the substantially flat head portion;
   (b) a neck having an opening and two substantially flat neck portions, the neck extending from the lower side of the substantially flat head portion at a substantially right angle with respect to the substantially flat head portion;
   (c) two substantially flat legs extending from the neck, each leg having an inner surface, the two surfaces of the two legs being at an initial substantial contact with each other, the legs being adapted to expand in opposite direction upon insertion through the hole of an expanding member;
   (d) a funnel configuration at a leg region where the legs start extending from the neck, the funnel having a second axis substantially coinciding with the first axis; and
   (e) an elastic body integrally molded at the lower side of the substantially flat head portion, wherein the upper side and the lower side of the substantially flat head are separated by a gap, and the elastic body is further molded within the gap.

5. A fastener as defined in claim 2, wherein the elastic body is further molded on the upper side of the substantially flat head portion.

6. A fastener as defined in claim 4, wherein the elastic body has been also molded at the perimeter of the substantially flat head portion.

7. A fastener as defined in claim 4, wherein the expanding member is a screw having threads and a root, the root having a second diameter.

8. A fastener as defined in claim 7, wherein the elastic body further includes a depression in the vicinity of the hole, the depression having a third axis substantially coinciding with the first and the second axis; and a third diameter smaller than the second diameter.

9. A fastener comprising:

(a) a substantially flat head portion having a perimeter, an upper side, and a lower side, the upper side having a hole, the hole having a first diameter and a first axis, the first axis being substantially perpendicular to the substantially flat head portion;

(b) a neck having an opening and two substantially flat neck portions, the neck extending from the lower side of the substantially flat head portion at a substantially right angle with respect to the substantially flat head portion;

(c) two substantially flat legs extending from the neck, each leg having an inner surface, the two surfaces of the two legs being at an initial substantial contact with each other, the legs being adapted to expand in opposite direction upon insertion through the hole of an expanding member, the expanding member being a screw having threads and a root, the root having a second diameter;

(d) a funnel configuration at a leg region where the legs start extending from the neck, the funnel having a second axis substantially coinciding with the first axis; and (e) an elastic body integrally molded at the lower side of the substantially flat head portion the elastic body including a depression in the vicinity of the hole, the depression having a third axis substantially coinciding with the first and the second axis; and a third diameter smaller than the second diameter.

10. A fastener as defined in claim 9, wherein the elastic body is foamed.

11. A fastener as defined in claim 5, wherein the elastic body is foamed.

12. A fastener as defined in claim 5, wherein the elastic body is selected from a group comprising plastisol, polyurethane, and a mixture thereof.

13. A fastener as defined in claim 5, wherein the hole is adapted to engage threads of a screw, and the funnel to lead said screw in a direction substantially coinciding with the first axis and expand the two legs.

14. A fastener as defined in claim 5, wherein the elastic body has a depression in the vicinity of the hole, the depression having a third axis substantially coinciding with the first and the second axis.

15. A fastener as defined in claim 14, wherein the depression has a third diameter smaller than the second diameter.

16. A fastener as defined in claim 15, wherein the elastic body is foamed.

17. A fastener as defined in claim 15, wherein the elastic body is selected from a group comprising plastisol, polyurethane, and a mixture thereof.

18. A fastener as defined in claim 14, wherein the hole is adapted to engage threads of a screw, and the funnel to lead said screw in a direction substantially coinciding with the first axis and expand the two legs.

19. A fastener as defined in claim 18, wherein the elastic body is foamed.

20. A fastener as defined in claim 19, wherein the elastic body is selected from a group comprising plastisol, polyurethane, and a mixture thereof.

21. A fastener as defined in claim 14, wherein the expanding member is a screw having threads and a root, the root having a second diameter, and wherein the elastic body further includes a depression in the vicinity of the hole, the depression having a third axis substantially coinciding with the first and the second axis; and a third diameter smaller than the second diameter.

22. An assembly of two objects connected substantially in a water-tight mode with a fastener, the fastener comprising:

(a) a substantially flat head portion having a perimeter, an upper side, and a lower side, the upper side having a hole, the hole having a first diameter and a first axis, the first axis being substantially perpendicular to the substantially flat head portion;

(b) a neck having an opening and two substantially flat neck portions, the neck extending from the lower side of the substantially flat head portion at a substantially right angle with respect to the substantially flat head portion;

(c) two substantially flat legs extending from the neck, each leg having an inner surface, the two surfaces of the two legs being at an initial substantial contact with each other, the legs being adapted to expand in opposite direction upon insertion through the hole of an expanding member;

(d) a funnel configuration at a leg region where the legs start extending from the neck, the funnel having a second axis substantially coinciding with the first axis; and (e) an elastic body integrally molded at the lower side of the substantially flat head portion, wherein the elastic body is selected from a group comprising plastisol, polyurethane, and a mixture thereof.

23. An assembly as defined in claim 22, wherein at least part of each of the two neck portions is uninterruptedly surrounded by part of the elastic body.

24. An assembly as defined in claim 22, wherein the assembly of two objects is a part of an automobile.

25. An assembly as defined in claim 22, wherein the upper side and the lower side of the substantially flat head are separated by a gap, and the elastic body is further molded within the gap.

26. An assembly as defined in claim 25, wherein the elastic body has been also molded at the perimeter of the substantially flat head portion.

27. An assembly as defined in claim 25, wherein the assembly is a part of an automobile.

28. An assembly as defined in claim 25, wherein the elastic body is further molded on the upper side of the substantially flat head portion.

29. An assembly as defined in claim 28, wherein the assembly is a part of an automobile.

30. An assembly as defined in claim 28, wherein the elastic body has a depression in the vicinity of the hole, the depression having a third axis substantially coinciding with the first and the second axis.

31. An assembly as defined in claim 30, wherein the depression has a third diameter smaller than the second diameter.

32. An assembly as defined in claim 31, wherein the assembly is a part of an automobile.

33. An assembly of two objects connected substantially in a water-tight mode with a fastener, the fastener comprising:

(a) a substantially flat head portion having a perimeter, an upper side, and a lower side, the upper side having a hole, the hole having a first diameter and a first axis, the first axis being substantially perpendicular to the substantially flat head portion;

(b) a neck having an opening and two substantially flat neck portions, the neck extending from the lower side of the substantially flat head portion at a substantially right angle with respect to the substantially flat head portion;

(c) two substantially flat legs extending from the neck, each leg having an inner surface, the two surfaces of the two legs being at an initial substantial contact with each other, the legs being adapted to expand in opposite direction upon insertion through the hole of an expanding member;

(d) a funnel configuration at a leg region where the legs start extending from the neck, the funnel having a second axis substantially coinciding with the first axis; and (e) an elastic body integrally molded at the lower side of the substantially flat head portion, wherein the upper side and the lower side of the substantially flat head are separated by a gap, and the elastic body is further molded within the gap.

34. An assembly as defined in claim 33, wherein the assembly is a part of an automobile.

35. An assembly as defined in claim 33, wherein the elastic body is foamed.

36. An assembly as defined in claim 35, wherein the assembly is a part of an automobile.

37. An assembly as defined in claim 33, wherein the expanding member is a screw having threads and a root, the root having a second diameter.

38. An assembly as defined in claim 36, wherein the elastic body further a depression in the vicinity of the hole, the depression having a third axis substantially coinciding with the first and the second axis; and a third diameter smaller than the second diameter.

39. An assembly as defined in claim 38, wherein the assembly is a part of an automobile.

40. An assembly as defined in claim 38, wherein the elastic body is foamed.

41. An assembly as defined in claim 38, wherein the elastic body is selected from a group comprising plastisol, polyurethane, and a mixture thereof.

42. An assembly as defined in claim 41, wherein the assembly is a part of an automobile.

43. An assembly as defined in claim 40, wherein the assembly is a part of an automobile.

* * * * *